(12) United States Patent
Sieve et al.

(10) Patent No.: US 11,078,952 B2
(45) Date of Patent: Aug. 3, 2021

(54) METHOD FOR PRODUCING A BALL JOINT

(71) Applicant: ZF Friedrichshafen AG, Friedrichshafen (DE)

(72) Inventors: Manfred Sieve, Lohne (DE); Jan Pabst, Osnabrück (DE); Frank Nachbar, Osnabrück (DE); Volker Grube, Diepholz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 96 days.

(21) Appl. No.: 16/489,873

(22) PCT Filed: Mar. 19, 2018

(86) PCT No.: PCT/EP2018/056810
§ 371 (c)(1),
(2) Date: Aug. 29, 2019

(87) PCT Pub. No.: WO2018/192728
PCT Pub. Date: Oct. 25, 2018

(65) Prior Publication Data
US 2020/0032840 A1 Jan. 30, 2020

(30) Foreign Application Priority Data
Apr. 20, 2017 (DE) ...................... 10 2017 206 706.3

(51) Int. Cl.
*F16C 11/06* (2006.01)
(52) U.S. Cl.
CPC ................ *F16C 11/0685* (2013.01)
(58) Field of Classification Search
CPC .............. F16C 11/0685; F16C 11/0623; F16C 2220/06
See application file for complete search history.

(56) References Cited

U.S. PATENT DOCUMENTS 8,281,490 B2 * 10/2012 Nishide ................. F16C 23/043
29/898.049
9,719,554 B2 * 8/2017 Nishide ............... F16C 11/0609
(Continued)

FOREIGN PATENT DOCUMENTS

DE       101 10 738 C1    11/2002
DE       10110738 C5 *   6/2008 ........... B60G 17/019
(Continued)

OTHER PUBLICATIONS

German Action Corresponding to 10 2017 206 706.3 dated Oct. 29, 2018.
(Continued)

*Primary Examiner* — Bayan Salone
(74) *Attorney, Agent, or Firm* — Finch & Maloney, PLLC; Michael J. Bujold

(57) ABSTRACT

A method for producing a ball joint having an outer housing with an outer housing stud opening, an inner housing arranged inside the outer housing and provided with an inner housing stud opening, and a ball stud having a joint ball is moveably fitted in the inner housing and which extends out through the inner housing stud opening. The method includes inserting and positioning the stud with its joint ball in the outer housing such that, between the outer housing and the stud, a free space surrounding the joint ball and/or stud remains and the stud extends out through the outer housing stud opening. After which the free space is filled with a plastic material which enclosed the joint ball and then cures to form the inner housing. A gap is formed between the outer and inner housings during curing and closed after curing by compressing the outer housing.

13 Claims, 3 Drawing Sheets

(56) References Cited

U.S. PATENT DOCUMENTS

| | | | | |
|---|---|---|---|---|
| 10,066,661 B2* | 9/2018 | Kim | ................... | F16C 11/0685 |
| 10,247,228 B2* | 4/2019 | Yu | ...................... | F16C 11/0604 |
| 2009/0279820 A1* | 11/2009 | Nishide | ............... | F16C 11/0685 |
| | | | | 384/206 |
| 2012/0141192 A1* | 6/2012 | Kwon | ................. | F16C 11/0657 |
| | | | | 403/135 |
| 2016/0160907 A1* | 6/2016 | Kim | ................... | F16C 11/0642 |
| | | | | 403/135 |

FOREIGN PATENT DOCUMENTS

| | | |
|---|---|---|
| DE | 11 2007 002 148 T5 | 10/2009 |
| EP | 3 023 652 A1 | 5/2016 |
| EP | 3023652 A1 * | 5/2016 .......... F16C 11/0642 |

OTHER PUBLICATIONS

International Search Report Corresponding to PCT/EP2018/056810 dated May 4, 2018.
Written Opinion Corresponding to PCT/EP2018/056810 dated May 4, 2018.

* cited by examiner

METHOD FOR PRODUCING A BALL JOINT

This application is a National Stage completion of PCT/EP2018/056810 filed Mar. 19, 2018, which claims priority from German patent application serial no. 10 2017 206 706.3 filed Apr. 20, 2017.

FIELD OF THE INVENTION

The invention relates to a method for producing a ball joint, which comprises an outer housing provided with an outer housing stud opening, an inner housing arranged inside the outer housing and provided with an inner housing stud opening, and a ball stud having a joint ball which, with its ball joint, is fitted movably inside the inner housing and extends through the inner housing stud opening out of the inner housing, wherein the ball stud is inserted into the outer housing and positioned therein with its joint ball in such manner that between the outer housing and the ball stud a free space remains, which surrounds the joint ball and/or the ball stud, and the ball stud extends through the outer housing stud opening out of the outer housing, after which the free space is filled with a plastic material so that the joint ball is enclosed by the plastic material, which then cures and in the cured condition forms the inner housing.

BACKGROUND OF THE INVENTION

Such a method is known for example from EP 3 023 652 A1. Its disadvantage is that the plastic material cannot be optimized in relation to its sliding-frictional properties. This is because plastic materials that lead to optimal sliding friction between the inner housing and the joint ball shrink substantially during their curing process, so that after curing the inner housing is not firmly seated within the outer housing. For that reason, in practice plastic materials are chosen which do not shrink, or only slightly so. However, such plastic materials do not give optimum results in relation to the sliding friction between the inner housing and the joint ball.

SUMMARY OF THE INVENTION

Starting from there the purpose of the present invention is to improve the sliding-friction properties between the inner housing and the joint ball, while still being able to ensure firm holding of the inner housing within the outer housing.

This objective is achieved by a method according to the independent claim(s). Preferred further developments of the method are indicated in the subordinate claims and in the description that follows.

The method mentioned at the beginning for producing a ball joint, which comprises an outer housing with an outer housing stud opening, an inner housing arranged inside the outer housing and provided with an inner housing stud opening, and a ball stud with a joint ball which is fitted movably with its joint ball in the inner housing and extends through the inner housing stud opening out of the inner housing,
  wherein
    the ball stud is inserted into the outer housing and positioned with its joint ball therein in such manner that between the outer housing and the ball stud there remains a free space which surrounds the joint ball and/or the ball stud, and the ball stud extends through the outer housing stud opening out of the outer housing,
    after which the free space is filled with a plastic material and during this the joint ball is enclosed by the plastic material, which material then cures and in the cured condition forms the inner housing,
  is in particular developed further in that a gap formed between the outer housing and the inner housing when the plastic material cures, is after the curing process closed by compressing the outer housing, in particular closed permanently.

By virtue of the compression the outer housing is deformed or reshaped in such manner that the gap between the outer housing and the inner housing closes. Thus, the inner housing is held firmly in the outer housing. Since, by virtue of the closing of the gap after the curing, shrinkage of the plastic material can be tolerated, a plastic can be used for the plastic material which enables low sliding friction between the inner housing and the joint ball. Preferably, by compression the outer housing is plastically and/or permanently deformed.

Preferably, in the context of the present application curing is understood to mean cooling, and/or a cured condition is understood to mean a cooled condition. In particular, curing and/or cooling is understood to mean that the plastic material becomes hard at a constant temperature. Preferably, curing takes place by virtue of the cooling of the plastic material. Thus a warmed or heated plastic material can be cooled, whereby the plastic material can be hardened.

The outer housing preferably extends in an axial direction. In particular, a central axis extending in the axial direction is associated with the outer housing. Advantageously, the outer housing has an outer housing wall that surrounds the central axis. Preferably, relative to the central axis the outer housing is designed rotationally symmetric or substantially rotationally symmetric. Advantageously, the wall of the outer housing is cylindrical or essentially cylindrical, in particular at its inner circumference. Preferably the compression of the outer housing takes place by reducing the diameter of the wall of the outer housing.

The inner housing preferably extends in the axial direction. Advantageously, the inner housing has an inner housing wall that surrounds the central axis. Advantageously, relative to the central axis the outer housing is designed rotationally symmetric or substantially rotationally symmetric. Preferably, particularly at its inner circumference the wall of the inner housing is shaped spherically or part-spherically, or substantially spherically or part-spherically. In particular, the gap is formed between the outside circumferential surface of the inner housing wall and the inside circumferential surface of the outer housing wall. Preferably, compression of the outer housing brings the wall of the outer housing, with its inside surface, into contact with the outside circumferential surface of the inner housing wall.

One or any direction transverse to the axial direction and/or to the central axis is in particular called a radial direction. The compression of the outer housing is preferably a radial compression and/or preferably takes place in the radial direction. The diameter reduction of the outer housing wall is preferably a radial diameter reduction and/or preferably takes place in the radial direction. For example, before compression the gap forms an annular space surrounding the central axis and/or the inner housing.

In particular, the outer housing is manufactured and/or provided. Preferably the outer housing consists of metal. Preferably the outer housing is made of metal. In particular the metal can be steel or aluminum. Advantageously, the outer housing consists of sheet-metal. Preferably, the outer housing is made from sheet-metal. The sheet is preferably a metallic sheet, for example steel sheet or aluminum sheet.

The ball stud is in particular manufactured and/or provided. Preferably, the ball stud consists of metal. In particular the metal concerned is steel or stainless steel or titanium. In particular, the ball stud comprises a shank. Preferably, the shank is connected firmly and/or solidly to the joint ball. Advantageously, the joint ball is attached at one end of the shank and/or the joint ball forms one end of the ball stud. Preferably a ball stud longitudinal axis is associated with the ball stud, which axis in particular extends through the mid-point of the joint ball. Preferably, relative to the ball stud axis the ball stud is rotationally symmetrical or substantially rotationally symmetrical. The end of the joint ball, in particular its end facing away from the shank in the direction of the ball stud axis, is preferably referred to as the pole or pole area. For example, in the pole area the joint ball is flattened and/or not spherically shaped. Preferably the ball stud extends out of the outer housing through the stud opening of the outer housing. In particular, the ball stud extends out of the housings through the stud openings. Preferably the central axis extends through the mid-point of the joint ball. In particular the ball stud is inserted into the outer housing and fitted with its joint ball inside the latter, in such manner that the central axis extends through the mid-point of the joint ball.

The inner housing preferably consists of plastic. Preferably, the inner housing is made from plastic and/or the plastic material. In particular the plastic material is polyamide (PA) or polyoxymethylene (POM). Advantageously, the plastic and/or the plastic material is mixed and/or reinforced with fibers. The fibers are for example glass fibers or carbon fibers.

In a further development, before the free space is filled with the plastic material an end of the outer housing that delimits the outer housing stud opening is bent inward, or radially inward, so that when the free space has been filled with the plastic material the end is embedded in the plastic material. Preferably, in this way the inner housing is secured with interlock on and/or in the outer housing, particularly in the axial direction. The end of the outer housing that delimits the outer housing stud opening is in particular an axial end of the outer housing.

In one embodiment, before the free space is filled with the plastic material an end of the outer housing facing away from the outer housing stud opening is bent inward or radially inward, so that after filling with the plastic material this end is embedded in the plastic material. Preferably, in this way the inner housing is secured with interlock on or in the outer housing, particularly in the axial direction. The end of the outer housing facing away from the outer housing stud opening is in particular an axial end of the outer housing. Advantageously, the end of the outer housing facing away from the outer housing stud opening delimits an opening of the outer housing used for assembly.

Preferably, the outer housing stud opening has a diameter smaller than the diameter of the joint ball. Preferably, the outer housing is designed in such manner, and/or the end of the outer housing that delimits the outer housing stud opening, is bent inward or radially inward in such manner, that the outer housing stud opening has a diameter which is smaller than the diameter of the ball joint. In that way, there is advantageously an overlap between the joint ball and the inwardly or radially inwardly bent end of the outer housing that delimits the outer housing stud opening. This axial overlap in particular increases the pull-out resistance of the ball stud.

Preferably, the assembly opening has a diameter which is larger than or equal to the diameter of the joint ball. Preferably, the outer housing is made in such manner, and/or the end of the outer housing facing away from the outer housing stud opening is bend inward or radially inward in such manner, that the assembly opening has a diameter greater than or equal to the diameter of the joint ball. Thus, the ball stud can be inserted through the assembly opening into the outer housing. Preferably, the ball stud is inserted through the assembly opening and/or through the end of the outer housing facing away from the outer housing stud opening.

According to a variant, in particular at an end of the outer housing facing away from the outer housing stud opening the outer housing is provided with an end-piece. In particular, a filling opening is provided in the end-piece, through which the free space is filled with the plastic material. Preferably, the outer housing stud opening has a diameter larger than or equal to the diameter of the joint ball. Preferably the outer housing is made in such manner, and/or the end of the outer housing that delimits the outer housing stud opening is bent inward or radially inward in such manner, that the outer housing stud opening has a diameter which is larger than or equal to the diameter of the joint ball. Thus, the ball stud can be inserted through the outer housing stud opening into the outer housing. Preferably the ball stud is inserted into the outer housing through the outer housing stud opening and/or the end of the outer housing that delimits the outer housing stud opening.

The filling of the free space with a plastic material takes place in particular by casting or injection molding. Preferably the joint ball is enclosed by the plastic material by casting or injecting the plastic material around the joint ball. In particular, the plastic material is cast or injection molded around the joint ball. Preferably, before the free space is filled with the plastic material the outer housing and the ball stud are held in or inserted into a die, which is preferably a casting die or an injection molding die. In particular, the free space is filled with the plastic material in the casting die or the injection molding die.

According to a further development, when the free space is being filled with the plastic material, the joint ball is enclosed by the plastic material as far as a stud opening area surrounding it, which after curing forms the inner housing stud opening. The stud opening area is in particular occupied or blocked by the die and is therefore protected against penetration of the plastic material.

Preferably, during the filling of the free space with the plastic material a connection area surrounding the stud opening area and/or the ball stud, and extending through the outer housing stud opening out of the outer housing, is formed by the plastic material. Advantageously, the connection area is provided with an annular groove on its outer circumference. The connection area and/or the annular groove serves in particular for attaching a sealing bellows. Preferably, on the connection area and/or on or in the annular groove a sealing bellows surrounding the ball stud is fixed, which preferably extends from the connection area and/or the annular groove as far as the ball stud and in particular is in contact with the latter, forming a seal.

In an embodiment, before the free space is filled with the plastic material the joint ball is covered in a pole area facing away from the outer housing stud opening by a pole cap, which, when the free space is filled with the plastic material, is embedded in the plastic material. In particular, in the pole area the joint ball deviates from its spherical shape. This is for example a result of the production method. Without a pole cap in this case the plastic material would also touch the joint ball in the pole area and would therefore, in the cured condition, impede and/or interfere with the movement of the joint ball in the inner housing. For example, the joint ball is flattened in its pole area facing away from the outer housing stud opening. The pole cap is in particular manufactured and/or provided. Preferably the pole cap consists of metal and/or plastic. Preferably the pole cap is made of metal and/or plastic. Preferably, before the free space is filled with the plastic material the pole cap is inserted and/or introduced into and/or positioned in the outer housing and/or in the die.

According to a further development the outer housing is press-fitted into a joint holder of a joint holding component. Preferably, during this the compression of the outer housing takes place by virtue of the pressing of the outer housing into the joint holder. In this way there is no need for a separate compression step preceding the fitting of the joint into the joint holder. The joint holding component is preferably a wheel carrier or a chassis control arm, such as a longitudinal control arm or a transverse control arm. The joint holder is, or is preferably formed by a bearing eye or by a recess provided in the joint holding component, which for example can be through-going. The joint holding component is in particular made and/or prepared. Advantageously, the joint holding component consists of plastic and/or metal. Preferably, the joint holding component is made from plastic and/or metal.

In an embodiment, preferably before the ball stud has been inserted into the outer housing, the outer housing is deformed to produce an annular collar at the outer periphery of the outer housing, after which in particular the outer housing is pressed into the joint holder until the annular collar is and/or comes into contact with the joint holding component. In this case the annular collar acts as a stop. For example, the annular collar is formed by upsetting the outer housing, specifically in the axial direction.

BRIEF DESCRIPTION OF THE DRAWINGS

Below, the invention will be described with reference to preferred embodiments, referring also to the drawing, which shows.

DETAILED DESCRIPTION OF THE PREFERRED EMBODIMENTS

Figure 1:
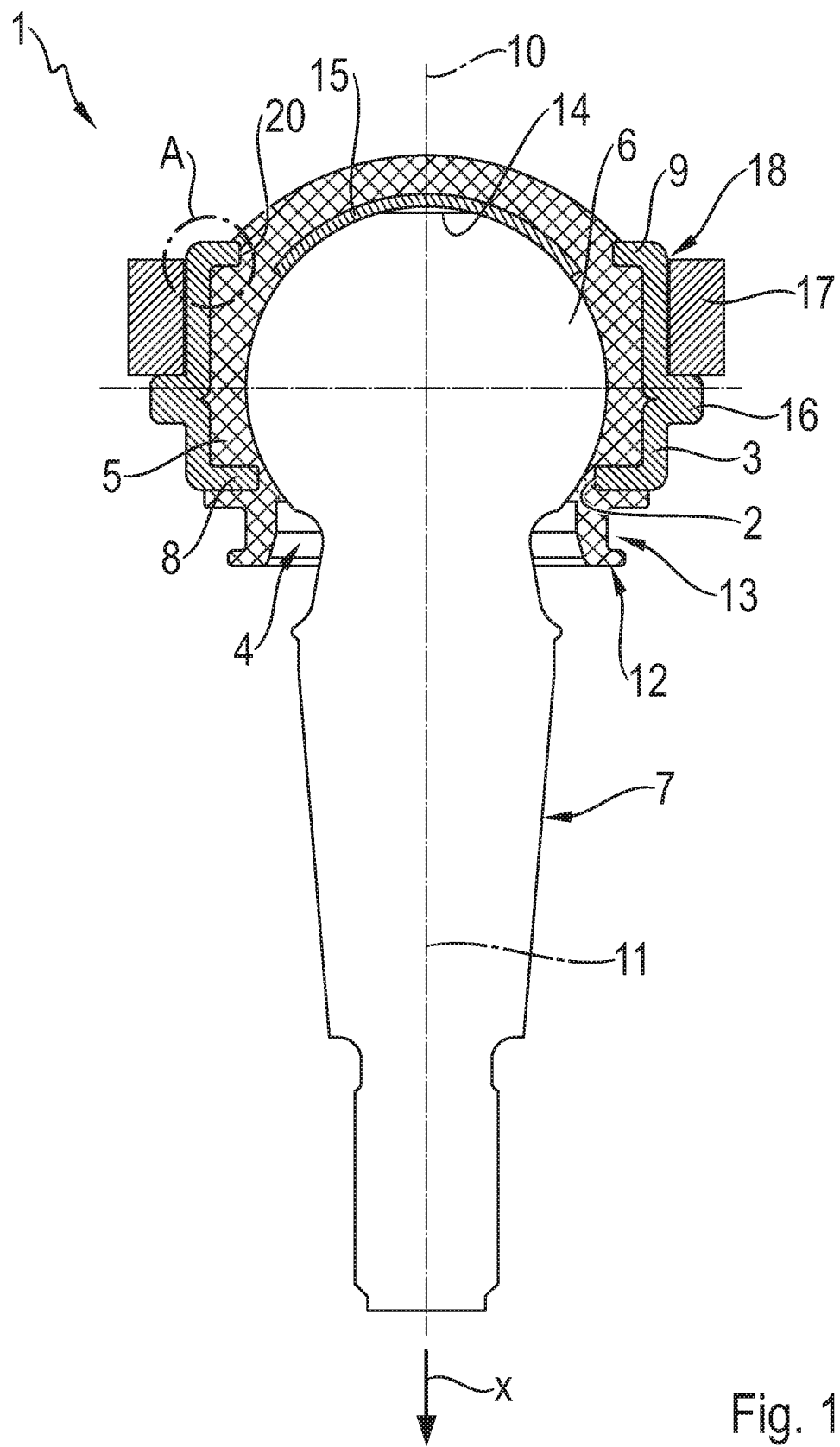
FIG. 1: A longitudinal section through a ball joint according to a first embodiment, pressed into a joint holder.

FIG. 1 shows a longitudinal section through a ball joint 1 according to a first embodiment, which comprises an outer housing 3 provided with an outer housing stud opening 2 and is made from sheet metal, arranged in the outer housing 3 an inner housing 5 made of plastic and provided with an inner housing stud opening 4, and a ball stud 7 with a joint ball 6, which with its joint ball 6 is fitted and can move in the inner housing 5 and which extends through the inner housing stud opening 4 out of the inner housing 5.

An end 8 of the outer housing 3 that delimits the outer housing stud opening 2 is bent inward and embedded in the plastic of the inner housing 5. In addition, an end 9 of the outer housing 3 facing away from the outer housing stud opening 2 is bent inward and embedded in the plastic of the inner housing 5. In this case the end 9 delimits an assembly opening 20 of the outer housing 3. Thus, the inner housing 5 is secured with interlock in the outer housing 3 in an axial direction x. Moreover, the diameter of the outer housing stud opening 2 is smaller than the diameter of the joint ball 6, so that the end 8 of the outer housing 3 that delimits the outer housing stud opening 2 overlaps the joint ball 6 in the axial direction x. In contrast, the diameter of the assembly opening 20 is larger than or equal to the diameter of the joint ball 6.

Associated with the outer housing 3 is a central axis 10, relative to which the outer housing 3 is formed rotationally symmetric. The inner housing 5 is also rotationally symmetric relative to the central axis 10. Furthermore, a ball stud axis 11 is associated with the ball stud 7, relative to which the ball stud 7 is rotationally symmetric. In the condition of the ball joint 1 shown in FIG. 1 the ball stud axis 11 coincides with the central axis 10.

The inner housing 5 comprises a connection area 12 that surrounds the inner housing stud opening 4 and extends through the outer housing stud opening 2 out of the outer housing 3, in which connection area an annular groove 13 is formed. The annular groove 13 serves for the attachment of a sealing bellows (not shown). Furthermore, in a pole area 14 facing away from the outer housing stud opening 2 the joint ball 6 is covered by a pole cap 15, which is embedded in the inner housing. In the pole area 14 the joint ball 6 is flattened.

At its outer periphery the outer housing 3 has an annular collar 16 which is in contact with a joint holder component 17 which has a joint holder 18 in the form of an aperture, into which the outer housing 3 is press-fitted.

Below, the production of the ball joint 1 will be described. First, the outer housing 3 and the ball stud 7 are made. Then, the outer housing 3 and the ball stud 7 are inserted into a die (not shown), wherein the ball stud 7 is introduced and positioned therein with its joint ball 6, in such manner that a free space surrounding the joint ball 6 and/or the ball stud 7 remains between the outer housing 3 and the ball stud 7, and the ball stud 7 extends the outer housing stud opening 2 out of the outer housing 3. During this the ball stud 7 is introduced into the outer housing 3 through the assembly opening 20, in particular in the direction of the arrow x. Furthermore, the pole cap 15 is preferably fitted into the outer housing 3 and/or positioned therein. After this the free space is filled with a plastic material, by which the joint ball 6 is enclosed. The plastic material then cures and, in the cured condition, forms the inner housing 5. The die is for example a casting die or an injection molding die. Moreover, the die is in particular designed in such manner that the plastic material adopts the shape, or approximately the shape of the inner housing 5.

Figure 2:
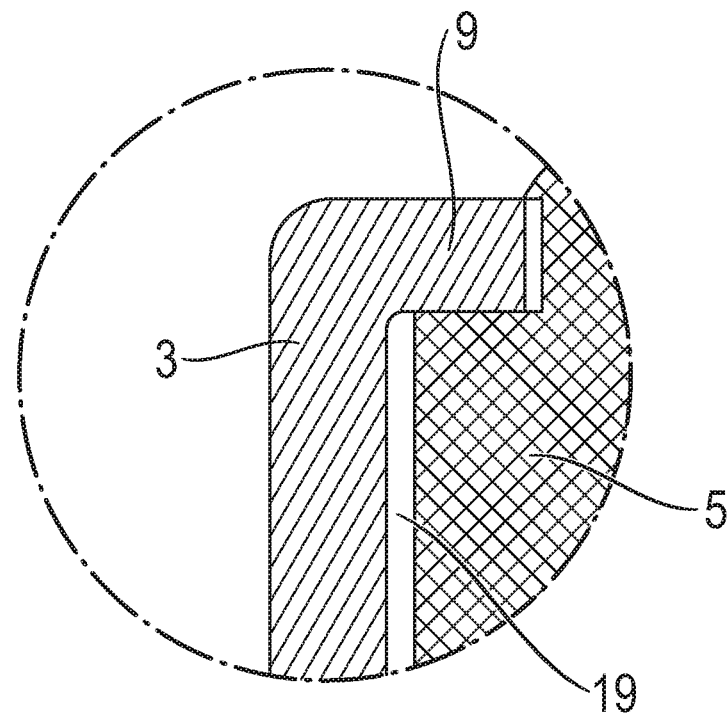
FIG. 2: Representation of an area marked A in FIG. 1, before the ball joint has been pressed into the joint holder.

FIG. 2 shows a representation of the area marked A in FIG. 1, before the outer housing is pressed into the joint holder 18. It can be seen that between the outer housing 3 and the inner housing 5 there is a gap 19, which is formed during the curing and/or cooling process of the plastic material. Specifically, this is because the plastic material and/or the inner housing 5 and/or the body formed by the plastic material shrinks during the curing and/or cooling process.

Thereafter, the ball joint 1 with its outer housing 3 is pressed into the joint holder 18 of the joint holding component 17. Owing to this pressing-in, the outer housing 3 is deformed in such manner that the gap 19 closes.

Figure 3:
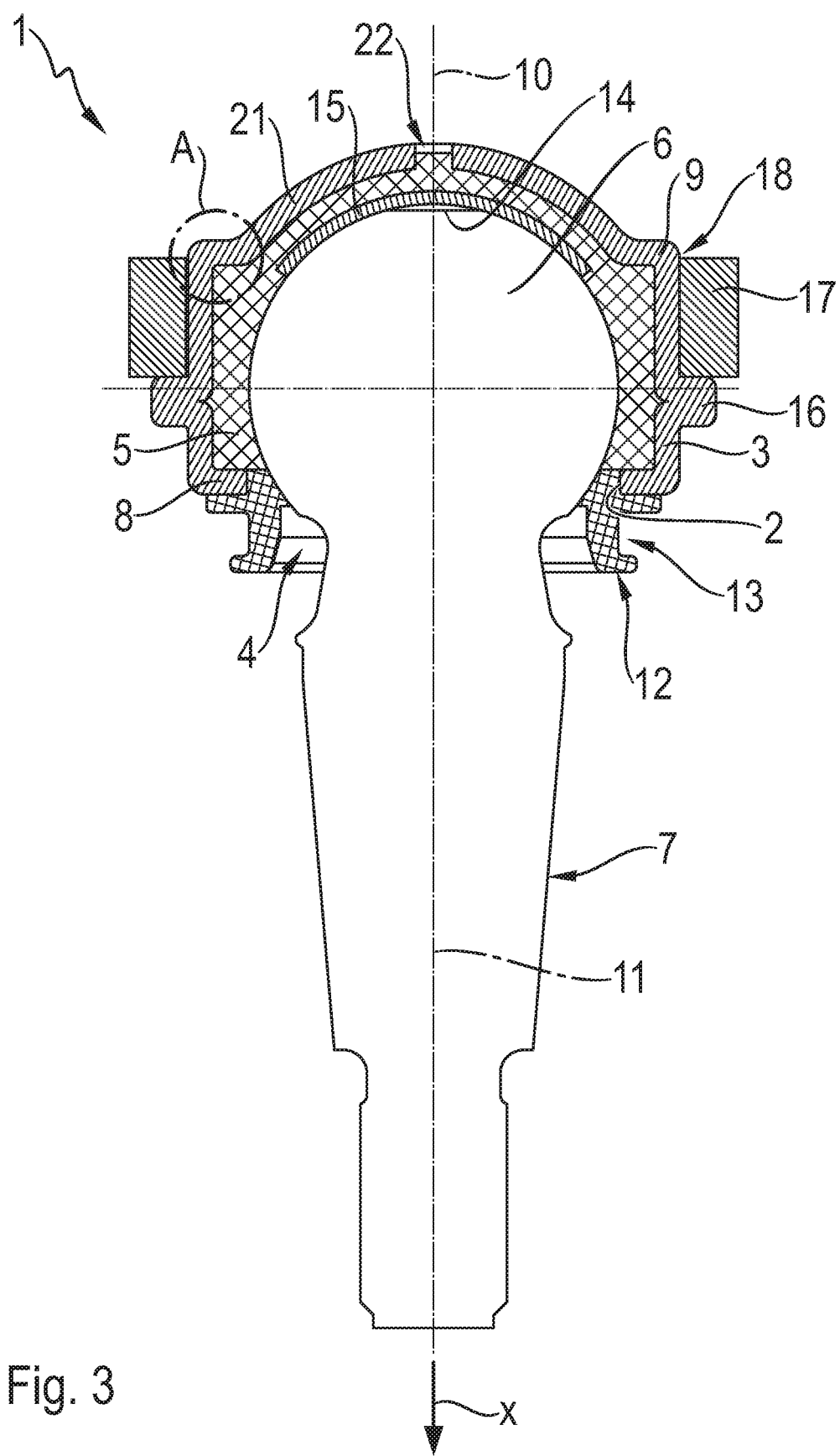
FIG. 3: A longitudinal section through a ball joint pressed into a joint holder, according to a second embodiment.

FIG. 3 shows a longitudinal section through a ball joint 1 according to a second embodiment, which comprises an outer housing 3 provided with an outer housing stud opening 2 and is made from sheet metal, arranged in the outer housing 3 is an inner housing 5 made of plastic and provided with an inner housing stud opening 4, and a ball stud 7 with a joint ball 6, which with its joint ball 6 is fitted and can move in the inner housing 5 and extends through the inner housing stud opening 4 out of the inner housing 5.

An end 8 of the outer housing 3 that delimits the outer housing stud opening 2 is bent inward and embedded in the plastic of the inner housing 5. Thus, the inner housing 5 is secured with interlock in the outer housing 3 in an axial direction x. In this case the diameter of the outer housing stud opening 2 is larger than or equal to the diameter of the joint ball 6. Furthermore, an end 9 of the outer housing 3 facing away from the outer housing stud opening 2 is provided with an end-piece 21, in which a filling opening 22 is provided.

Associated with the outer housing 3 is a central axis 10, relative to which the outer housing 3 is designed rotationally symmetrically. The inner housing 5 too is rotationally symmetrical relative to the central axis 10. Moreover a ball stud central axis 11 is associated with the ball stud 7, relative to which the ball stud 7 is rotationally symmetrical. In the condition of the ball joint 1 shown in FIG. 3, the ball stud axis 11 coincides with the central axis 10.

The inner housing 5 has a connection area 12 which surround the inner housing stud opening 4 and extends out of the outer housing 2 through the outer housing stud opening 2, in the outer periphery of which area an annular groove 13 is formed. This groove 13 serves for the attachment of a sealing bellows (not shown). Moreover, in a pole area 14 facing away from the outer housing stud opening 2 the joint ball 6 is covered by a pole cap 15, which is embedded in the inner housing. In the pole area 14 the joint ball 6 is flattened.

At its outer periphery the outer housing 3 has an annular collar 16, which is in contact with a joint holding component 17 having a joint holder 18 in the form of an aperture into which the outer housing 3 is pressed.

Below, the production of the ball joint 1 will be described. First, the outer housing 3 and the ball stud 7 are made. Then, the outer housing 3 and the ball stud 7 are placed in a die (not shown), wherein the ball stud 7 is introduced into the outer housing 3 and positioned therein with its joint ball 6, in such manner that between the outer housing 3 and the ball stud 7 a free space remains which surrounds the joint ball 6 and/or the ball stud 7 and the ball stud 7 extends through the outer housing stud opening 2 out of the outer housing 3. In this case the ball stud 7 is introduced into the outer housing 3 through the outer housing stud opening 2 in the direction opposite to the arrow x. Furthermore, the pole cap 15 is preferably fitted into the outer housing 3 and/or positioned therein. Thereafter, the free space is filled with a plastic material, which encloses the joint ball 6. The plastic material cures and/or cools and in the cured and/or cooled condition forms the inner housing 5. For this, the plastic material is in particular introduced into the free space through the filling opening 22. The die is for example a casting die or an injection molding die. Moreover, the die is in particular designed such that the plastic material adopts the shape of the inner housing 5, or approximately so.

Figure 4:
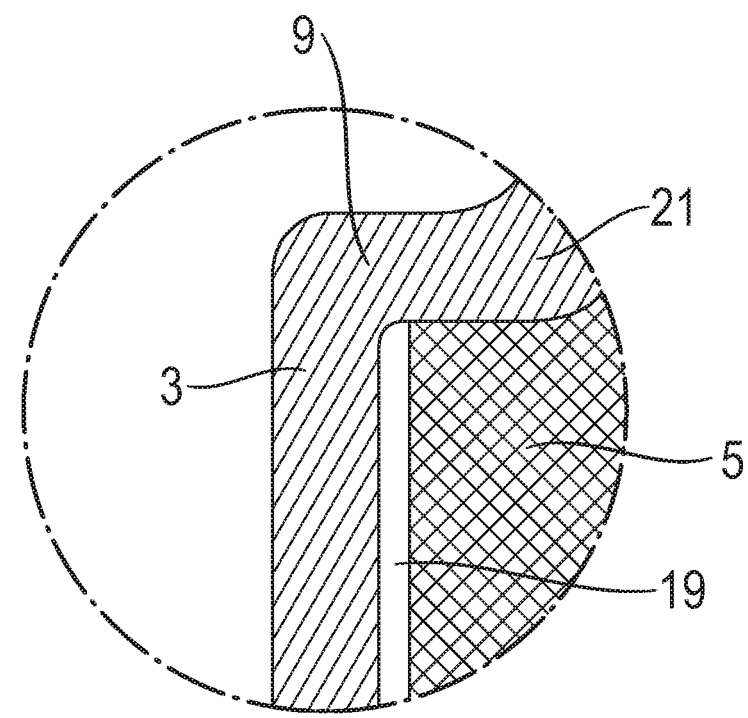
FIG. 4: Representation of an area marked A in FIG. 3, before the ball joint has been pressed into the joint holder.

FIG. 4 shows a representation of the area marked A in FIG. 3, before the outer housing 3 is pressed into the joint holder 18. It can be seen that between the outer housing 3 and the inner housing 5 there is a gap 19, which is formed when the plastic material cures. This is in particular because the plastic material and/or the inner housing 5 and/or the body formed by the plastic material shrinks during the curing and/or cooling of the plastic material.

Thereafter, the ball joint 1 with its outer housing 3 is pressed into the joint holder 18 of the joint holding component 17. Due to the pressing-in, the outer housing 3 is deformed in such manner that the gap 19 closes.

INDEXES

1 Ball joint
2 Outer housing stud opening
3 Outer housing
4 Inner housing stud opening
5 Inner housing
6 Joint ball of the ball joint
7 Ball stud
8 Axial end of the outer housing
9 Axial end of the outer housing
10 Central axis of the outer housing
11 Ball stud axis of the ball stud
12 Connection area of the inner housing
13 Annular groove in the connection area
14 Pole area of the joint ball
15 Pole cap
16 Annular collar of the outer housing
17 Joint holding component
18 Joint holder of the joint holding component
19 Gap
20 Assembly opening of the outer housing
21 End-piece of the outer housing
22 Filling opening in the end-piece of the outer housing
x Axial direction

The invention claimed is:

1. A method for producing a ball joint that comprises an outer housing provided with an outer housing stud opening, an inner housing arranged inside the outer housing and provided with an inner housing stud opening, and a ball stud provided with a joint ball, which with the joint ball is fitted and movable within the inner housing and which extends through the inner housing stud opening out of the inner housing, the method comprising:
   inserting and positioning the ball stud in the outer housing with the joint ball in such a manner that, between the outer housing and the ball stud, a free space surrounding at least one of the joint ball and the ball stud remains, and the ball stud extends through the outer housing stud opening out of the outer housing,
   subsequently filling the free space with a plastic material such that the joint ball is enclosed by the plastic material, which, once in a cured condition, forms the inner housing, and
   during curing, closing a gap formed between the outer housing and the inner housing, and
   thereafter compressing the outer housing.

2. The method according to claim 1, further comprising, before filling the free space with the plastic material, inwardly bending an end of the outer housing, that delimits the outer housing stud opening, and then, when the free space is filled with the plastic material, embedding the end in the plastic material.

3. The method according to claim 2, further comprising, before filling the free space with the plastic material, inwardly bending an opposite end of the outer housing, facing away from the outer housing stud opening, and then, when the free space is filled with the plastic material, embedding the opposite end in the plastic material.

4. The method according to claim 3, further comprising inserting the ball stud into the outer housing through the opposite end of the outer housing facing away from the outer housing stud opening.

5. The method according to claim 2, further comprising inwardly bending the end of the outer housing, that delimits the outer housing stud opening, such that the outer housing stud opening has a smaller diameter than a diameter of the joint ball.

6. The method according to claim 2, further comprising providing the outer housing with an end-piece in which a filling opening is made, through which the free space is filled with the plastic material.

7. The method according to claim 6, further comprising inserting the ball stud into the outer housing through the end of the outer housing that delimits the outer housing stud opening.

8. The method according to claim 1, further comprising, during filling of the free space with the plastic material, enclosing the joint ball by the plastic material as far as a stud opening area that surrounds the ball stud which, after curing, forms the inner housing stud opening.

9. The method according to claim 8, further comprising, when the free space is filled with the plastic material, forming a connection area, with the plastic material, which surrounds the stud opening area and extends through the outer housing stud opening out of the outer housing.

10. The method according to claim 9, further comprising providing the connection area with an annular groove on an outer circumference thereof.

11. The method according to claim 1, further comprising, before filling the free space with the plastic material, covering the joint ball, in a pole area thereof facing away from the outer housing stud opening, by a pole cap and embedding the pole cap in the plastic material when the free space is filled with the plastic material.

12. The method according to claim 1, further comprising pressing the outer housing into a joint holder of a joint holding component such that the outer housing is compressed by pressing the outer housing into the joint holder.

13. The method according to claim 12, further comprising, before inserting the hall stud into the outer housing, deforming the outer housing to produce an annular collar at an outer periphery of the outer housing, after which the outer housing is pressed into the joint holder until the annular collar comes in contact with the joint holding component.

* * * * *